(12) United States Patent
Guterman et al.

(10) Patent No.: US 9,186,828 B2
(45) Date of Patent: Nov. 17, 2015

(54) METHODS FOR FORMING ELONGATED ANTENNAS WITH PLASTIC SUPPORT STRUCTURES FOR ELECTRONIC DEVICES

(75) Inventors: Jerzy Guterman, Mountain View, CA (US); Jonathan Haylock, Los Angeles, CA (US); Boon W. Shiu, San Jose, CA (US); Peter Jeziorek, Mountain View, CA (US); Erdinc Irci, Cupertino, CA (US); Jiang Zhu, Sunnyvale, CA (US); Mattia Pascolini, Campbell, CA (US)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 13/490,356

(22) Filed: Jun. 6, 2012

(65) Prior Publication Data

US 2013/0328730 A1  Dec. 12, 2013

(51) Int. Cl.
| | |
|---|---|
| H01Q 1/24 | (2006.01) |
| H01P 11/00 | (2006.01) |
| B29C 45/00 | (2006.01) |
| B29C 33/76 | (2006.01) |
| H01Q 1/12 | (2006.01) |
| H01Q 1/22 | (2006.01) |
| H01Q 1/38 | (2006.01) |
| H01Q 7/00 | (2006.01) |
| B29C 45/14 | (2006.01) |
| B29C 45/16 | (2006.01) |

(52) U.S. Cl.
CPC ............. *B29C 45/0055* (2013.01); *B29C 33/76* (2013.01); *H01Q 1/12* (2013.01); *H01Q 1/2266* (2013.01); *H01Q 1/38* (2013.01); *H01Q 7/00* (2013.01); *B29C 45/14639* (2013.01); *B29C 45/16* (2013.01); *B29C 2045/0058* (2013.01)

(58) Field of Classification Search
USPC ...................... 343/700 MS, 702, 866; 29/600
See application file for complete search history.

(56) References Cited

U.S. PATENT DOCUMENTS

| 3,573,834 A | 4/1971 | McCabe et al. |
| 4,733,245 A | 3/1988 | Mussler |
| 5,461,393 A | 10/1995 | Gordon |
| 5,703,600 A | 12/1997 | Burrell et al. |

(Continued)

FOREIGN PATENT DOCUMENTS

| CN | 1256802 A | 6/2000 |
| CN | 1133237 | 12/2003 |

(Continued)

*Primary Examiner* — Tan Ho
(74) *Attorney, Agent, or Firm* — Treyz Law Group; G. Victor Treyz; Michael H. Lyons

(57) ABSTRACT

Electronic devices may be provided with antenna structures. The antenna structures may include an antenna support structure covered with patterned antenna traces. An antenna support structure may be mounted in an electronic device so that a surface of the antenna support structure that is covered with patterned antenna traces lies flush with a planar surface of the electronic device housing. A display cover layer or other planar structure may be attached to the surface of the antenna support structure and the planar surface of the housing adhesive. Injection molding and extrusion techniques may be used in forming a support structure with elongated parallel cavities. An injection molding tool may have a mold core supported by a support structure at one end, supporting engagement features at the ends of mating mold core structures, or support pins. Molded interconnect devices may be soldered to laser direct structuring components to form antennas.

25 Claims, 16 Drawing Sheets

(56) References Cited

U.S. PATENT DOCUMENTS

| | | | |
|---|---|---|---|
| 5,877,728 | A | 3/1999 | Wu et al. |
| 5,914,693 | A | 6/1999 | Takei et al. |
| 5,936,583 | A * | 8/1999 | Sekine et al. ........... 343/702 |
| 6,081,729 | A | 6/2000 | Bauerschmidt et al. |
| 6,127,987 | A | 10/2000 | Maruyama et al. |
| 6,225,959 | B1 | 5/2001 | Gordon |
| 6,339,400 | B1 | 1/2002 | Flint et al. |
| 6,380,930 | B1 | 4/2002 | Van Ruymbeke |
| 6,621,466 | B2 | 9/2003 | Kuck |
| 6,642,892 | B2 | 11/2003 | Masaki et al. |
| 6,646,605 | B2 | 11/2003 | McKinzie et al. |
| 6,677,909 | B2 | 1/2004 | Sun et al. |
| 6,831,607 | B2 | 12/2004 | Hebron et al. |
| 6,859,186 | B2 | 2/2005 | Lizalek et al. |
| 6,861,995 | B2 | 3/2005 | Kuo et al. |
| 6,894,650 | B2 | 5/2005 | Darden et al. |
| 7,126,553 | B1 | 10/2006 | Fink et al. |
| 7,199,756 | B2 | 4/2007 | Cha et al. |
| 7,233,678 | B2 | 6/2007 | Erixon et al. |
| 7,256,743 | B2 | 8/2007 | Korva |
| 7,322,833 | B1 | 1/2008 | Hakansson et al. |
| 7,342,539 | B2 | 3/2008 | Rosenberg et al. |
| 7,345,634 | B2 | 3/2008 | Ozkar et al. |
| 7,405,704 | B1 | 7/2008 | Lin et al. |
| 7,446,729 | B2 | 11/2008 | Maruyama et al. |
| 7,463,121 | B2 | 12/2008 | D'Ostilio |
| 7,486,242 | B2 | 2/2009 | Gala Gala et al. |
| 7,629,930 | B2 | 12/2009 | Murch et al. |
| 7,688,276 | B2 | 3/2010 | Quintero Illera et al. |
| 7,710,331 | B2 | 5/2010 | Schillmeier et al. |
| 7,804,453 | B2 | 9/2010 | Chiang et al. |
| 8,054,232 | B2 | 11/2011 | Chiang et al. |
| 8,059,039 | B2 | 11/2011 | Ayala Vazquez et al. |
| 8,102,319 | B2 | 1/2012 | Schlub et al. |
| 8,269,677 | B2 | 9/2012 | Guterman et al. |
| 8,599,089 | B2 | 12/2013 | Bevelacqua et al. |
| 8,638,549 | B2 | 1/2014 | Garelli et al. |
| 8,766,858 | B2 * | 7/2014 | Li et al. ........... 343/702 |
| 8,773,310 | B2 | 7/2014 | Shiu et al. |
| 2002/0171594 | A1 | 11/2002 | Fang |
| 2003/0001780 | A1 | 1/2003 | Hill et al. |
| 2003/0090426 | A1 | 5/2003 | Sun et al. |
| 2003/0197648 | A1 | 10/2003 | Quinn et al. |
| 2004/0075611 | A1 | 4/2004 | Kenoun et al. |
| 2004/0097270 | A1 | 5/2004 | Cha et al. |
| 2004/0108960 | A1 | 6/2004 | Kuo et al. |
| 2005/0017914 | A1 | 1/2005 | Huang |
| 2005/0200535 | A1 | 9/2005 | Elkobi et al. |
| 2006/0164315 | A1 | 7/2006 | Munk |
| 2006/0227053 | A1 | 10/2006 | Ishikura |
| 2007/0120740 | A1 | 5/2007 | Iellici et al. |
| 2007/0176846 | A1 | 8/2007 | Vazquez et al. |
| 2007/0202933 | A1 | 8/2007 | Tolbert et al. |
| 2007/0216594 | A1 | 9/2007 | Uno et al. |
| 2007/0262090 | A1 | 11/2007 | Ritsche |
| 2007/0296592 | A1 | 12/2007 | Huang et al. |
| 2008/0316117 | A1 | 12/2008 | Hill et al. |
| 2009/0067141 | A1 | 3/2009 | Dabov et al. |
| 2009/0115683 | A1 | 5/2009 | Kurashima et al. |
| 2009/0133825 | A1 | 5/2009 | Prat et al. |
| 2009/0153412 | A1 | 6/2009 | Chiang et al. |
| 2009/0174612 | A1 | 7/2009 | Ayala et al. |
| 2009/0265969 | A1 | 10/2009 | Nezu |
| 2009/0295648 | A1 | 12/2009 | Dorsey et al. |
| 2009/0315788 | A1 | 12/2009 | Hirota |
| 2010/0073241 | A1 | 3/2010 | Ayala Vazquez et al. |
| 2010/0123632 | A1 | 5/2010 | Hill et al. |
| 2010/0156741 | A1 | 6/2010 | Vazquez et al. |
| 2010/0321253 | A1 | 12/2010 | Ayala Vazquez et al. |
| 2010/0321325 | A1 | 12/2010 | Springer et al. |
| 2011/0025575 | A1 | 2/2011 | Niederkorn et al. |
| 2011/0111719 | A1 | 5/2011 | Man et al. |
| 2011/0175790 | A1 | 7/2011 | Yanagi et al. |
| 2011/0188179 | A1 | 8/2011 | Myers et al. |
| 2011/0241943 | A1 | 10/2011 | Shiu et al. |
| 2011/0241948 | A1 | 10/2011 | Bevelacqua et al. |
| 2011/0254745 | A1 | 10/2011 | Tsujimura et al. |
| 2012/0026048 | A1 | 2/2012 | Vazquez et al. |
| 2012/0068893 | A1 | 3/2012 | Guterman et al. |
| 2012/0127040 | A1 | 5/2012 | Tang et al. |
| 2012/0218695 | A1 | 8/2012 | Sakai |
| 2012/0223865 | A1 | 9/2012 | Li et al. |
| 2012/0223866 | A1 * | 9/2012 | Ayala Vazquez et al. ..... 343/702 |
| 2012/0280876 | A1 | 11/2012 | Qu |
| 2013/0050032 | A1 | 2/2013 | Shiu et al. |
| 2013/0057367 | A1 * | 3/2013 | Smith ........... 333/24 C |
| 2013/0293424 | A1 | 11/2013 | Zhu et al. |
| 2013/0328730 | A1 | 12/2013 | Guterman et al. |
| 2014/0009344 | A1 | 1/2014 | Zhu et al. |
| 2014/0085161 | A1 | 3/2014 | Zhu et al. |
| 2014/0086441 | A1 | 3/2014 | Zhu et al. |
| 2014/0184453 | A1 | 7/2014 | Chen et al. |
| 2014/0292591 | A1 | 10/2014 | Li et al. |

FOREIGN PATENT DOCUMENTS

| | | |
|---|---|---|
| CN | 2850006 Y | 12/2006 |
| CN | 101068056 | 11/2007 |
| CN | 101276239 | 10/2008 |
| EP | 0543645 | 5/1993 |
| EP | 1329979 | 7/2003 |
| EP | 1329985 | 7/2003 |
| EP | 1483880 | 12/2004 |
| EP | 1868263 | 12/2007 |
| EP | 1950834 | 7/2008 |
| EP | 2034556 | 3/2009 |
| EP | 2110882 | 10/2009 |
| EP | 2128924 | 12/2009 |
| EP | 2495806 | 9/2012 |
| GB | 2437838 | 11/2007 |
| GB | 2485688 | 5/2012 |
| JP | HEI 09-083233 | 3/1997 |
| JP | 2003280815 | 10/2003 |
| JP | 2006048166 | 2/2006 |
| JP | 2007266822 | 10/2007 |
| JP | 2008306552 | 12/2008 |
| JP | 200935523 | 2/2009 |
| JP | 200965388 | 3/2009 |
| JP | 2009118027 | 5/2009 |
| JP | 2009290270 | 12/2009 |
| JP | 201010822 | 1/2010 |
| KR | 10-2004-0044211 | 5/2004 |
| KR | 10-2007-0016731 | 2/2007 |
| KR | 10-2010-0062539 | 6/2010 |
| TW | 201004024 | 1/2010 |
| WO | 9913526 | 3/1999 |
| WO | 99/36988 | 7/1999 |
| WO | 0215325 | 2/2002 |
| WO | 2007083500 | 7/2007 |
| WO | 2007135230 | 11/2007 |
| WO | 2012027024 | 3/2012 |

* cited by examiner

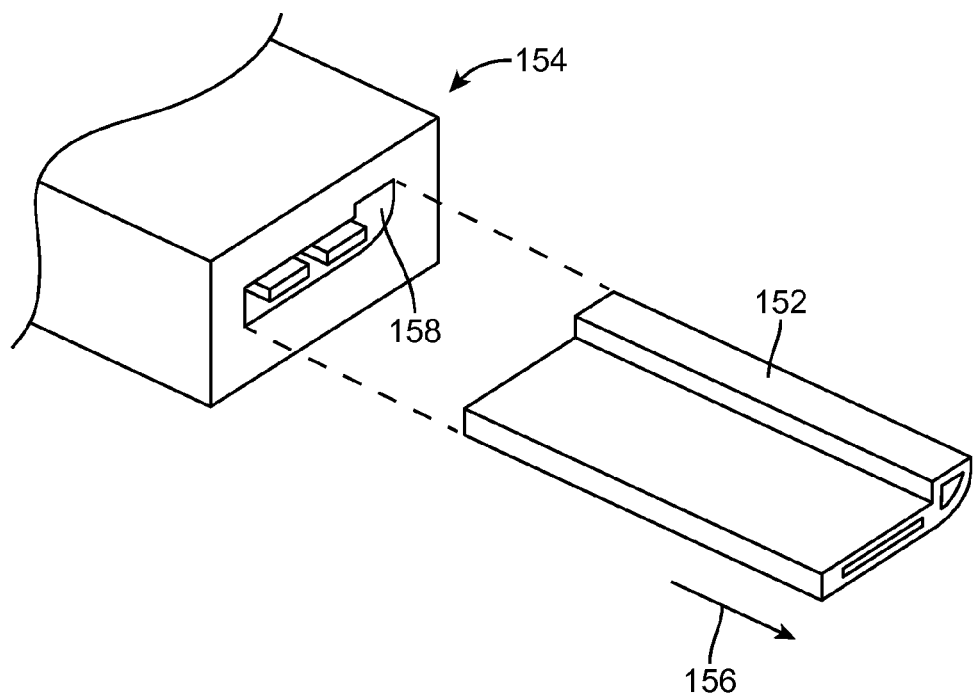
FIG. 18
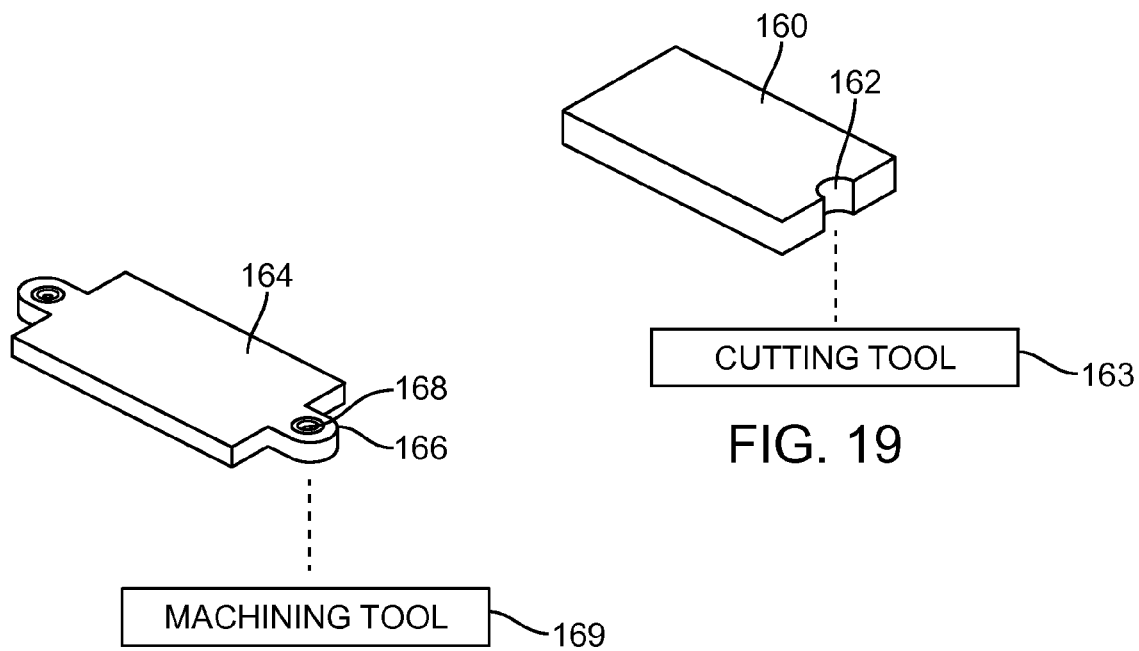
FIG. 19
FIG. 20

METHODS FOR FORMING ELONGATED ANTENNAS WITH PLASTIC SUPPORT STRUCTURES FOR ELECTRONIC DEVICES

BACKGROUND

This relates generally to electronic devices and, more particularly, to forming antennas for electronic devices.

Electronic devices such as computers are often provided with antennas. For example, a computer monitor with an integrated computer may be provided with antennas that are located along an edge of the monitor.

Challenges can arise in mounting antennas within an electronic device. For example, the relative position between an antenna and surrounding device structures and the size and shape of antenna structures can have an impact on antenna tuning and bandwidth. If care is not taken, an antenna may become detuned or may exhibit an undesirably small efficiency bandwidth at desired operating frequencies. Unsatisfactory antenna mounting configurations have the potential to compromise the structural integrity of an electronic device. Methods for forming antenna structures should be cost effective and capable of producing high-performing antennas, so as to avoid undesired expense and shortcomings in wireless performance.

It would therefore be desirable to be able to provide improved antennas for use in electronic devices.

SUMMARY

Electronic devices may be provided with antenna structures. The antenna structures may include an antenna support structure covered with patterned antenna traces. An antenna support structure may be formed from a dielectric such as plastic. Antenna traces on a support structure may be formed from a conductive material such as metal. The antenna traces may be used to form a loop antenna structure or other types of antenna.

An antenna may be mounted in an electronic device so that a surface of an antenna support structure that is covered with patterned antenna traces lies flush with a planar surface of the electronic device housing. A display cover layer or other planar structure may be attached to the surface of the antenna support structure and the planar surface of the housing adhesive.

Injection molding techniques may be used in forming an antenna support structure. The antenna support structure may be formed from a hollow plastic member and may have elongated parallel cavities.

An injection molding tool for forming a plastic antenna support structure may have an outer mold and a mold core. The mold core may have parallel elongated members for forming the elongated parallel cavities.

During injection molding, the mold core may be supported. The mold core may, for example, be supported by a support structure that engages one of the ends of an elongated mold core structure. If desired, the mold core may be formed by opposing elongated mold core structures. The opposing mold core structures may engage one another using matching engagement features located at the ends of the structures. Each of these mold core structures may include multiple parallel elongated mold core members for forming hollow plastic antenna support structures with parallel elongated cavities. Mold core structures may also be supported using support pins.

Antennas may be formed from multiple parts. Antenna parts may, for example, be formed using injection molding, laser patterning, and other fabrication techniques. As an example, a first portion of an antenna may be formed from a molded interconnect device. The molded interconnect device may be formed from first and second shots of plastic having different metal affinities. Metal antenna traces may be formed on the first shot of plastic while leaving the second shot of plastic uncovered by metal. A second portion of the same antenna may be formed using laser direct structuring. The first and second portions of the antenna may be connected to each other to form an antenna. For example, solder may be used to connect the first and second portions.

Further features of the invention, its nature and various advantages will be more apparent from the accompanying drawings and the following detailed description of the preferred embodiments.

BRIEF DESCRIPTION OF THE DRAWINGS

FIG. 18 is a perspective view of an extrusion tool of the type that may be used to form an antenna support structure for an antenna in accordance with an embodiment of the present invention.

FIG. 19 is a perspective view of an illustrative antenna support having a die-cut feature in accordance with an embodiment of the present invention.

FIG. 20 is a perspective view of an illustrative antenna support structure of the type that may be formed using machining tools or other equipment in accordance with an embodiment of the present invention.

DETAILED DESCRIPTION

Electronic devices may be provided with antennas and other wireless communications circuitry. The wireless communications circuitry may be used to support wireless communications in multiple wireless communications bands. One or more antennas may be provided in an electronic device. For example, antennas may be used to form an antenna array to support communications with a communications protocol such as the IEEE 802.11(n) protocol that uses multiple antennas.

Figure 1:
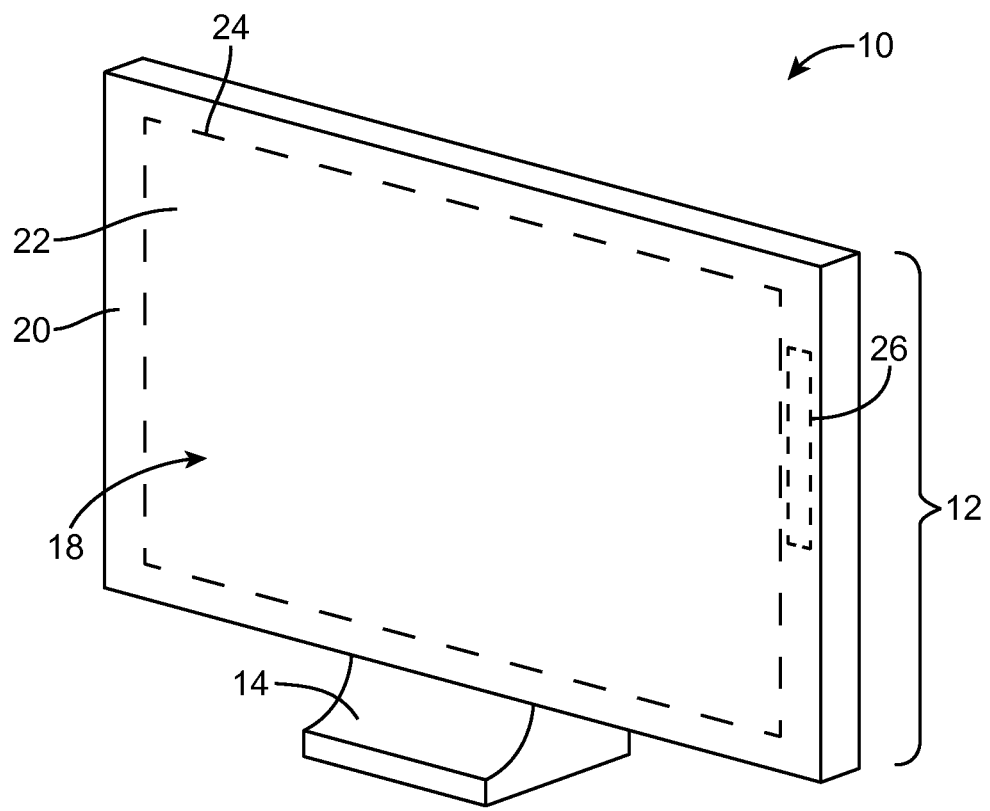
FIG. 1 is a perspective view of an illustrative electronic device with antenna structures in accordance with an embodiment of the present invention.

An illustrative electronic device of the type that may be provided with one or more antennas is shown in FIG. 1. Electronic device 10 may be a computer such as a computer that is integrated into a display such as a computer monitor. Electronic device 10 may also be a laptop computer, a tablet computer, a somewhat smaller portable device such as a wrist-watch device, pendant device, headphone device, earpiece device, or other wearable or miniature device, a cellular telephone, a media player, or other electronic equipment. Illustrative configurations in which electronic device 10 is a computer formed from a computer monitor are sometimes described herein as an example. In general, electronic device 10 may be any suitable electronic equipment.

Antennas may be formed in device 10 in any suitable location such as location 26 or other locations along the edge of the housing for device 10. The antennas in device 10 may include loop antennas, inverted-F antennas, strip antennas, planar inverted-F antennas, slot antennas, cavity antennas, hybrid antennas that include antenna structures of more than one type, or other suitable antennas. The antennas may cover cellular network communications bands, wireless local area network communications bands (e.g., the 2.4 and 5 GHz bands associated with protocols such as the Bluetooth® and IEEE 802.11 protocols), and other communications bands. The antennas may support single band and/or multiband operation. For example, the antennas may be dual band antennas that cover the 2.4 and 5 GHz bands. The antennas may also cover more than two bands (e.g., by covering three or more bands or by covering four or more bands).

Conductive structures for the antennas may, if desired, be formed from conductive electronic device structures such as conductive housing structures, from conductive structures such as metal traces on plastic carriers, from metal traces in flexible printed circuits and rigid printed circuits, from metal foil supported by dielectric carrier structures, from wires, from other conductive materials, and from structures including two or more or three or more of these types of conductive structures.

Device 10 may include a display such as display 18. Display 18 may be mounted in a housing such as electronic device housing 12. Housing 12 may be supported using a stand such as stand 14 or other support structure.

Housing 12, which may sometimes be referred to as a case, may be formed of plastic, glass, ceramics, fiber composites, metal (e.g., stainless steel, aluminum, etc.), other suitable materials, or a combination of these materials. Internal housing structures such as metal plates, frame structures, and other housing members may be included in device 10, if desired. In some situations, parts of housing 12 may be formed from dielectric or other low-conductivity material. In other situations, housing 12 or at least some of the structures that make up housing 12 may be formed from metal elements.

Display 18 may be a touch screen that incorporates capacitive touch electrodes or other touch sensor components or may be a display that is not touch sensitive. Display 18 may include image pixels formed from light-emitting diodes (LEDs), organic LEDs (OLEDs), plasma cells, electrophoretic ink elements, electrowetting display elements, liquid crystal display (LCD) components, or other suitable image pixel structures.

A display cover layer such as a layer of cover glass, a plastic cover layer, or other transparent planar dielectric member may cover the surface of display 18. Rectangular active region 22 of display 18 may lie within rectangular boundary 24. Active region 22 may contain an array of image pixels that display images for a user. Active region 22 may be surrounded by an inactive peripheral region such as rectangular ring-shaped inactive region 20. The inactive portions of display 18 such as inactive region 20 are devoid of active image pixels. Display driver circuits, antennas (e.g., antennas in regions such as region 26), and other components that do not generate images may be located under inactive region 20.

The cover layer for display 18 may cover both active region 22 and inactive region 20. The inner surface of the cover layer in inactive region 20 may be coated with a layer of an opaque masking material such as opaque plastic (e.g., a dark polyester film) or black ink. The opaque masking layer may help hide internal components in device 10 such as antennas, driver circuits, housing structures, mounting structures, and other structures from view. If desired, display 18 may be implemented using a borderless or nearly borderless configuration in which inactive region 20 is omitted or reduced in size.

In a configuration for display 18 that includes an inactive region, the inactive region may, if desired, overlap antennas in device 10. For example, antennas may be mounted in region 26 under an inactive portion of the display cover layer and may transmit and receive signals through the display cover layer. This type of configuration may allow antennas to operate, even when some or all of the structures in housing 12 are formed from conductive materials. For example, mounting the antenna structures of device 10 in region 26 under part of inactive region 20 may allow the antennas to operate even in arrangements in which some or all of the walls of housing 12 are formed from a metal such as aluminum or stainless steel (as examples).

Figure 2:
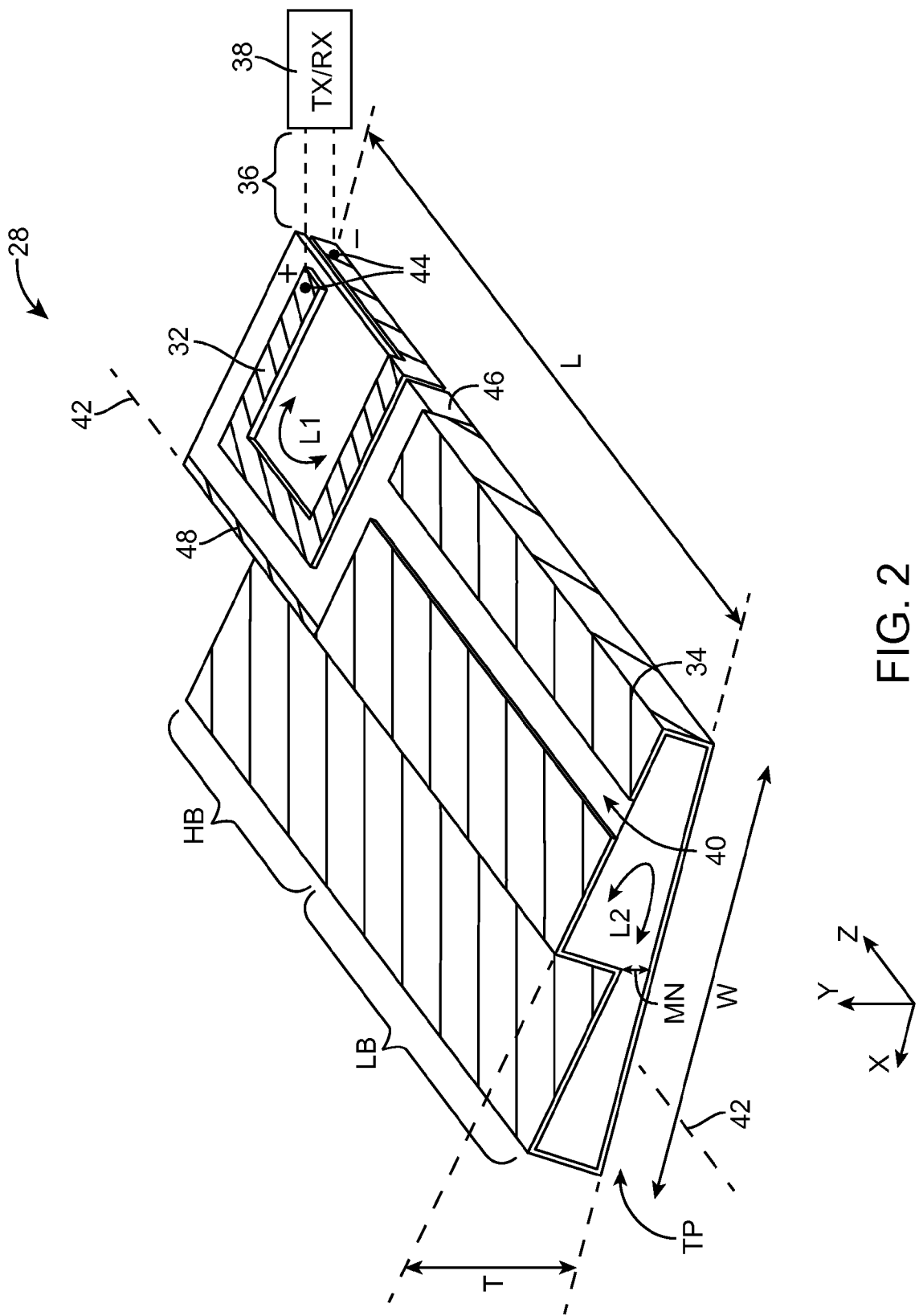
FIG. 2 is a perspective view of an illustrative distributed loop antenna having a main body portion and an extending tail portion in accordance with an embodiment of the present invention.

FIG. 2 is a perspective view of an illustrative configuration that may be used for an antenna in device 10. Antenna 28 may have metal traces such as traces 30 and 32 on a dielectric support structure such as dielectric support structure 46. Metal traces such as traces 30 and 32 may be used to form an inverted-F antenna, a patch antenna, a loop antenna, an open-ended slot antenna, a closed slot antenna, an antenna having multiple branches to support multiple frequency bands of operation, a directly fed antenna, an indirectly fed antenna, a monopole antenna, a dipole antenna, or an antenna of other suitable types.

In the illustrative arrangement of FIG. 2, antenna 28 has been configured to form a loop antenna having a loop-shaped antenna resonating element structure L2 formed from conductive traces 34. In loop antenna resonating element L2, gap 40 may form a capacitor that couples opposing ends of metal traces 34. The dimension D of structure 46 may be relatively large (e.g., more than 1 cm), so that structure 28 is elongated along longitudinal axis 42. Because the size of conductive structures 34 (transverse to loop L2) is relatively large, loop antenna 28 of FIG. 2 may sometimes be referred to as a distributed loop antenna. If desired, other types of antenna may be used in region 26 of device 10. The configuration of FIG. 2 is merely illustrative.

Antenna 28 may be directly fed or indirectly fed. As shown in FIG. 2, for example, antenna 28 may be indirectly fed using near-field-coupled antenna feed structure L1. Antenna feed structure L1 may be fed using antenna feed terminals 44 (e.g., a positive antenna feed terminal + and a ground antenna feed terminal −). The antenna feed terminals of antenna 28 may be coupled to radio-frequency transceiver circuitry 32 by circuitry 36. Radio-frequency transceiver circuitry 32 may include transmitter and/or receiver circuitry configured to operate in one or more communications bands such as wireless local area network bands at frequencies such as 2.4 GHz and 5 GHz, the Bluetooth® band at 2.4 GHz, cellular telephone bands from 700 MHz to 2700 MHz or other suitable frequencies, satellite navigation system bands, etc. Circuitry 34 may include transmission line structures such as coaxial cable, microstrip transmission lines, edge coupled transmission lines, transmission lines formed from flexible printed circuit material, and cables formed on rigid printed circuit boards. Circuitry 36 may also include switches, filters, impedance matching circuits, and other circuitry.

Feed structure L1 may have the shape of an inductor (e.g., a loop of conductor) or other structure that emits electromagnetic signals. Antenna resonating element structure L2 may have a loop shape or other suitable shape that is electromagnetically coupled to feed structure L1. Feed structure L1 and antenna resonating element structure L2 may also be coupled through shared ground traces. Using near-field electromagnetic coupling from structure L1 (i.e., an indirect feed arrangement), antenna resonating element structure L2 may be used to transmit and/or receive wireless radio-frequency signals.

Dielectric support structures 46 may be formed from a dielectric such as plastic, glass, ceramic, or other dielectric material. As an example, dielectric support structures 46 may be formed from plastic that is formed using techniques such as injection molding, extrusion, and machining. If desired, support structures 46 may be hollow. In situations in which support structures 46 have an air-filled cavity, support structures 46 may have a wall of plastic or other dielectric material that extends around axis 42 under patterned conductive structures 34 and 32. To provide structural support, one or more additional walls such as an interior wall that runs the length of structure 46 parallel to axis 42 may also be provided, if desired.

Antenna 28 of FIG. 2 may support dual band operations (e.g., operations at a low band of 2.4 GHz and a high band of 5.0 GHz, or other suitable low and high communications bands). With a configuration of the type shown in FIG. 2, loop antenna resonating element L2 may, as an example, exhibit a resonance at 2.4 GHz and a second harmonic resonance near 5.0 GHz. Antenna feed element L1 may tend to exhibit a resonance at 5.0 GHz that helps enhance the performance of element L2 at 5.0 GHz. With this type of configuration, high-band portion HB of antenna 28 may be primarily used in handling high-band signals (e.g., signals in the 5.0 GHz band) and low-band portion LB may be used in handling low band signals (e.g., signals in the 2.4 GHz band) and some high-band signals. Portion 48 of antenna 28 in high band section HB may help couple element L1 and L2 (and may therefore help element L1 serve as a satisfactory feeding structure for antenna 28).

Conductive structures 34 in resonating element loop L2 of antenna 28 may include a sheet of conductor that is wrapped around longitudinal axis 42. During operation, antenna currents can flow within this sheet around axis 42. In effect, sheet 34 forms a wide strip of conductor in the shape of a loop that is characterized by a perimeter. The antenna currents flowing in sheet 34 tend to lie in planes parallel to the X-Y plane of FIG. 2. As a result, the "loop" of loop antenna 28 effectively lies in the X-Y plane, whereas longitudinal axis 42 runs along the center of the wrapped conductive sheet (sheet 34) and lies parallel to the Z-axis (and perpendicular to the X-Y plane of the antenna loop). In a typical installation arrangement, longitudinal axis 42 of antenna 28 may extend parallel to an adjacent edge of housing 12 in electronic device 10.

Antenna 28 may have a thin elongated shape with longitudinal dimensions that are significantly larger than lateral (transverse) dimensions. For example, length L may be greater than 1 cm, greater than 2 cm, greater than 4 cm, greater than 6 cm, 1-5 cm, 1-10 cm, less than 10 cm, 3-10 cm, or other suitable length, whereas width W may be about 1-50 mm, greater than 5 mm, 3-20 mm, 5-15 mm, 8-12 mm, or other suitable width. The magnitude of maximum thickness T may be 2-5 mm, 4-10 mm, 6 mm, 5 mm, 4 mm, 3 mm, 2 mm, or other suitable thickness. The magnitude of MN (and therefore the minimum thickness of tail portion TP of antenna 28) may be, for example, 1 mm, 1.5 mm, 2 mm, or other suitable thickness. For example, MN may be 0.7-1.5 mm, 0.8 to 1.4 mm, etc. In configurations in which structure 46 is formed from a hollow plastic structure, the wall thickness of the structure may be, as an example, 0.7 to 0.9 mm, less than 1 mm, less than 2 mm, or other suitable thickness.

Figure 3:
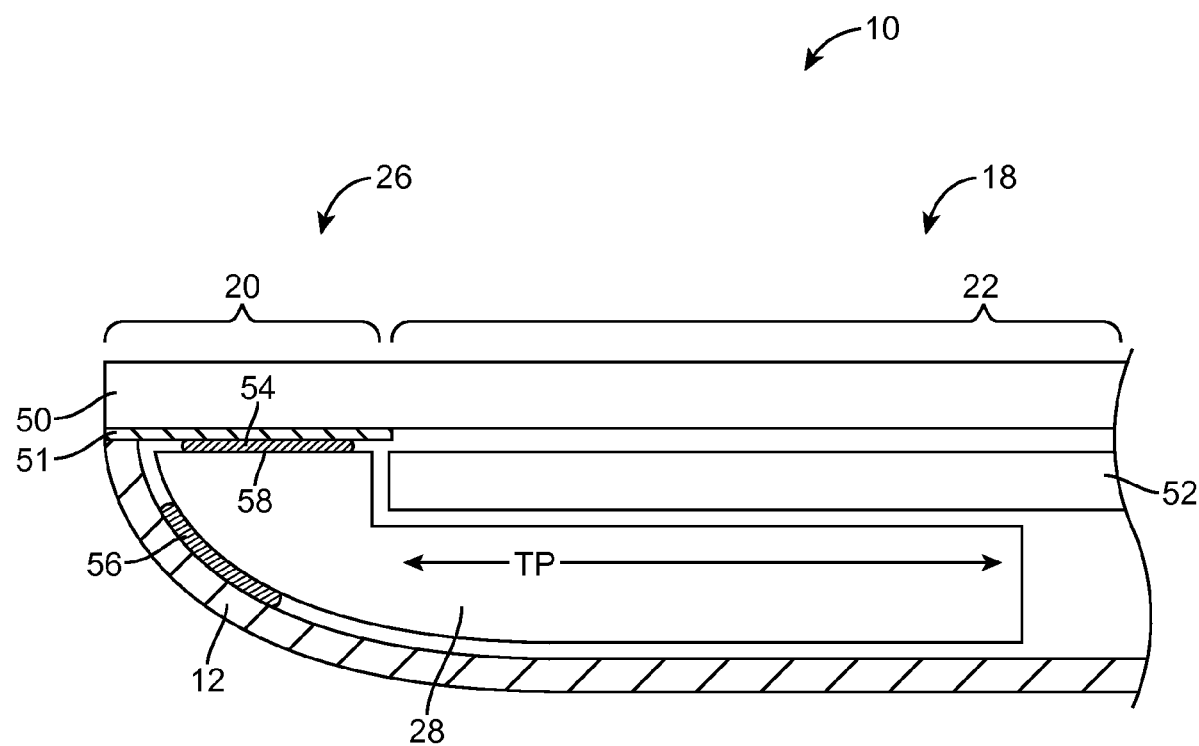
FIG. 3 is a cross-sectional side view of an edge portion of an electronic device of the type shown in FIG. 1 in which an antenna such as antenna of the type shown in FIG. 2 has been mounted in accordance with an embodiment of the present invention.

FIG. 3 is a cross-sectional side view of device 10 showing how antenna 28 may be mounted below a display cover layer in device 10 such as display cover layer 50. Device 10 may have a display such as display 18, as described in connection with FIG. 1. Display 18 may have display structures such as display structures 52 that are covered by display cover layer 50. Display structures 52 may include a liquid crystal display module, an organic light-emitting diode array, or other types of display structures. Display structures 52 may include an array of display pixels for producing images for a user of device 10. Display structures 52 may be mounted under display cover layer 50. Display cover layer 50 may be formed form a transparent planar member such as a sheet of cover glass or a clear plastic layer.

Housing 12 may be formed from a conductive material such as metal. A conductive structure such as conductive foam 56 may be interposed between the metal traces on antenna 28 and conductive housing 12. Conductive foam 56 may electrically short the conductive traces on antenna 28 to housing 12 (e.g., to ground housing 12).

Antenna 28 may be attached to housing 12 or other support structures. Part of antenna 28 (e.g., tail portion TP) may extend under display module 52. Part of antenna 28 may serve as a mounting structure for components in device 10. For example, antenna 28 may have a surface such as surface 58 that lies parallel to the innermost surface of display cover layer 50. Adhesive 54 may be interposed between display cover layer 50 and surface 58 of antenna 28 to bond display cover layer 50 to antenna 28. This allows antenna 28 to serve as a structural support for display cover layer 50. Display cover layer 50 may also be attached to housing 12 (e.g., by using adhesive to attach display cover layer 50 to a portion of housing 12 that lies flush with antenna surface 58). By providing display cover layer 50 with additional attachment surface area using surface portion 58 on antenna 28, the strength with which display cover layer 50 is attached to device 10 may be enhanced. Optional opaque masking layer 51 (e.g., black ink) may be formed on the underside of display cover layer 50 in inactive region 20.

Figure 4:
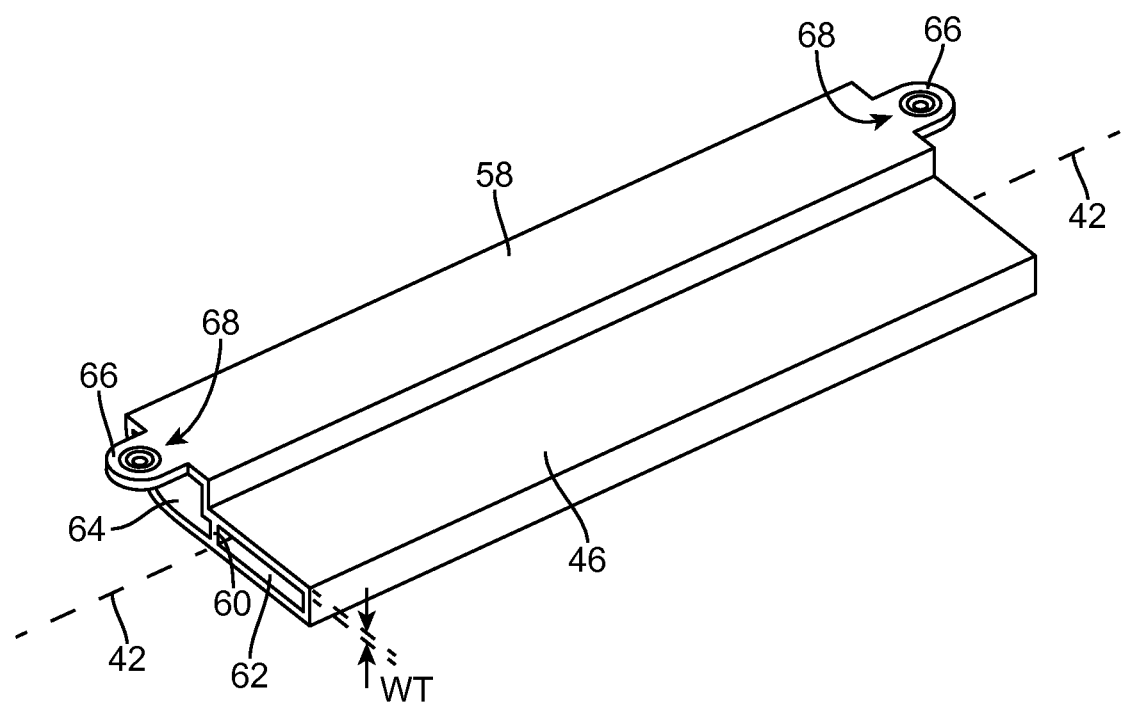
FIG. 4 is a perspective view of an illustrative antenna of the type that may be mounted in an edge portion of an electronic device such as the electronic device of FIG. 1 in accordance with an embodiment of the present invention.

FIG. 4 is a perspective view of an illustrative configuration that may be used for support structures 46. As shown in FIG. 4, support structures 46 may be hollow and may have walls characterized by a thickness WT. The walls of support structures 46 may surround an internal cavity (e.g., an air-filled cavity). Interior cavity features such as interior wall 60 may be used to separate the cavity into two or more smaller cavities. For example, interior support structure wall 60 may run the length of structures 46 parallel to longitudinal axis 42 and may separate the cavity in structures 46 into two respective elongated cavities such as cavity 62 and cavity 64 that run parallel to each other and parallel to longitudinal axis 42.

Antenna support structures 46 may have features for mounting antenna support structures to device 10. For example, antenna support structures 46 may have protrusions such as tabs 66. Tabs 66 may be provided with screw holes 68. Screws may have shafts that pass through holes 68 and heads that bear against tabs 66 to hold antenna 28 in place within housing 12. Once antenna 28 has been attached to housing 12 in this way, antenna 28 may serve as a structural support member for additional structures in device 10. For example, additional structures such as display cover layer 50 of display 18 (FIG. 3) may be attached to surface 58 of support structure 46 to help mount these additional structures to housing 12 and device 10.

Figure 5:
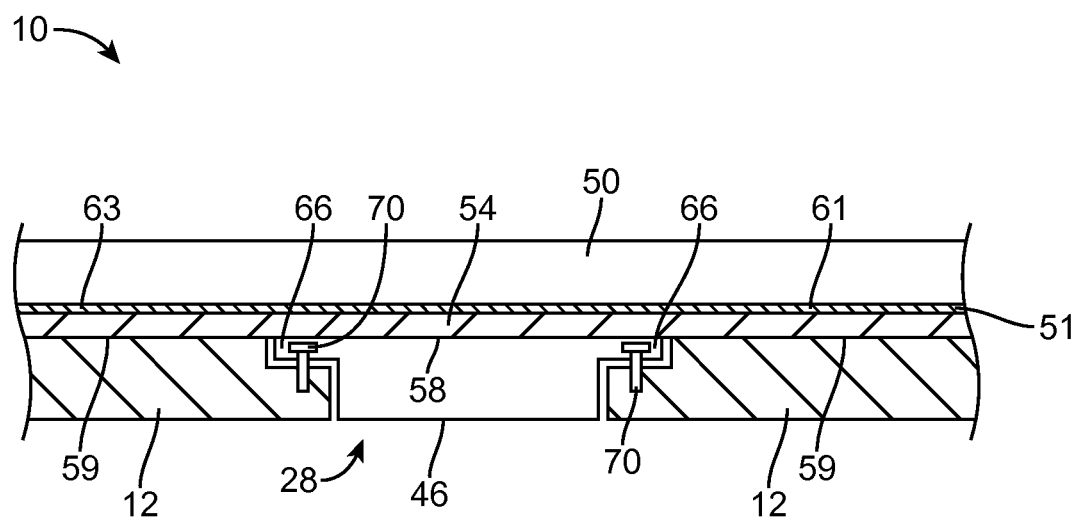
FIG. 5 is a cross-sectional view of an antenna such as the antenna of FIG. 4 mounted within an electronic device in accordance with an embodiment of the present invention.

FIG. 5 is a side view of a portion of device 10 showing an illustrative arrangement that may be used in mounting antenna 28 within housing 12 of device 10. As shown in FIG. 5, housing 12 may have planar surfaces such as housing surfaces 59 that lie flush with planar antenna surface 58 of antenna 28 and antenna support structures 46. Planar housing surface 59 may be formed from a ledge that is formed as an integral portion of housing 12 (e.g., a machined metal surface that is formed as an edge of a metal housing). Planar housing surface 59 may also be formed from plastic or metal support structures (e.g., internal frame members or other structure) that form internal housing structures.

Support structures 46 may have protruding portions 66 that are attached to housing 12 or internal structures within housing 12. For example, adhesive, fasteners, or other attachment mechanisms may be used in attaching antenna 28 and support structures 46 to housing 12. As shown in FIG. 5, for example, screws 70 may pass through openings 68 (FIG. 4) in protrusions 66 and may screw into threaded holes in housing 12, an internal frame, or other housing structure. Adhesive 54 may be used to attach planar interior surface 61 of display cover layer 50 or other planar dielectric structures to both planar outer antenna surface 58 and planar housing structure surface 59.

In some configurations for antenna support structures 46, structures 46 and antenna 28 may have an elongated shape. Due to the elongated nature of support structure 46 and antenna 28 and the relatively thin size of the walls of structure 46 in this type of configuration, it can be challenging to manufacture support structure 46. These challenges may be addressed using injection molding techniques, extrusion techniques, techniques for machining plastic structures 46, and other suitable manufacturing techniques.

Figure 6:
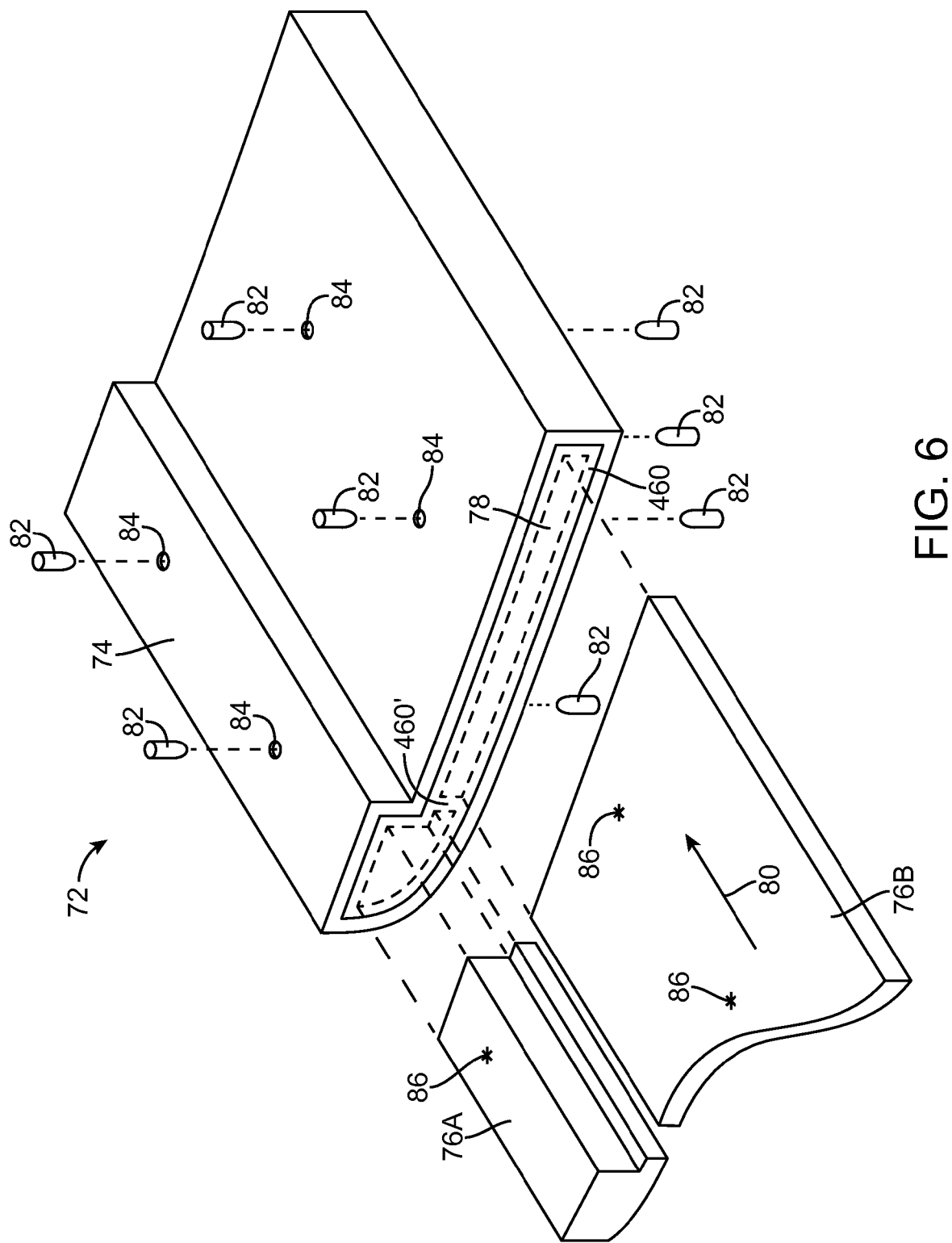
FIG. 6 is an exploded perspective view of a plastic injection molding tool having an outer mold structure and a mold core with multiple parallel mold core members in accordance with an embodiment of the present invention.

FIG. 6 is an exploded perspective view of an illustrative plastic injection molding tool of the type that may be used to form antenna support structures 46. As shown in FIG. 6, injection molding tool 72 may include outer mold structures such as outer mold 74 and one or more inner mold structures such as mold core structures 76A and 76B. During injection molding operations, mold cores 76A and 76B may be inserted within cavity 78 of outer mold 74 in direction 80. When cores 76A and 76B are inside outer mold 74, support structures such as pins 82 may be used to prevent cores 76A and 76B from flexing along their lengths. Pins 82 may pass through openings in outer mold 74 such as openings 84 and may contact cores 76A and 76B at locations such as locations 86, thereby stabilizing cores 76B and 76A and ensuring that the thin gaps between cores 76A and 76B and opposing portions of outer mold 74 will be accurately maintained at their desired sizes during injection molding operations. During injection molding, plastic may be injected into gap areas 460 around the exterior of cores 76B and 76A and inside the interior of outer mold 74. Gap portion 460' (i.e., the gap that develops between core members 76A and 76B) may be used in forming internal supporting walls such as wall 60 of FIG. 4.

Figure 7:
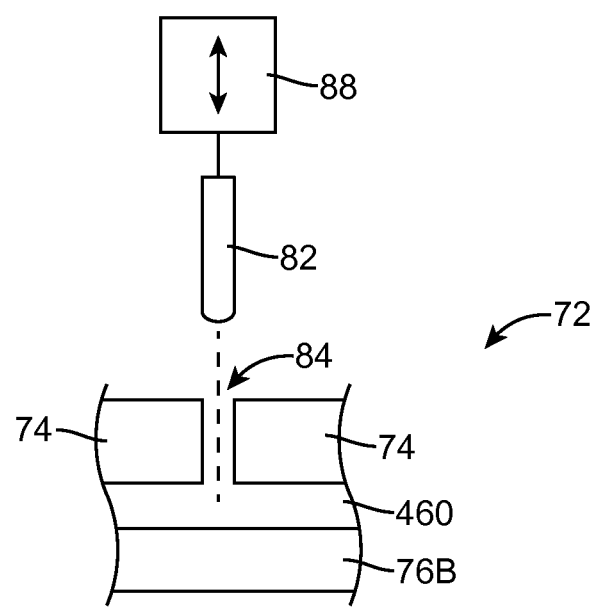
FIG. 7 is a cross-sectional side view of a portion of an injection molding tool showing how a stabilizing member such as a pin may pass through an opening in an injection molding wall to stabilize a mold core structure in accordance with an embodiment of the present invention.

FIG. 7 is a cross-sectional side view of a portion of injection molding tool 72 showing how the position of a stabilizing member such as pin 82 may be adjusted using computer-controlled positioner 88. Prior to injection molding of plastic into cavity region 460 inside mold 74, core 76B (and core 76A) may be stabilized by inserting pins such as pin 82 through openings such as opening 82 using computer-controlled positioner 88.

Figure 8:
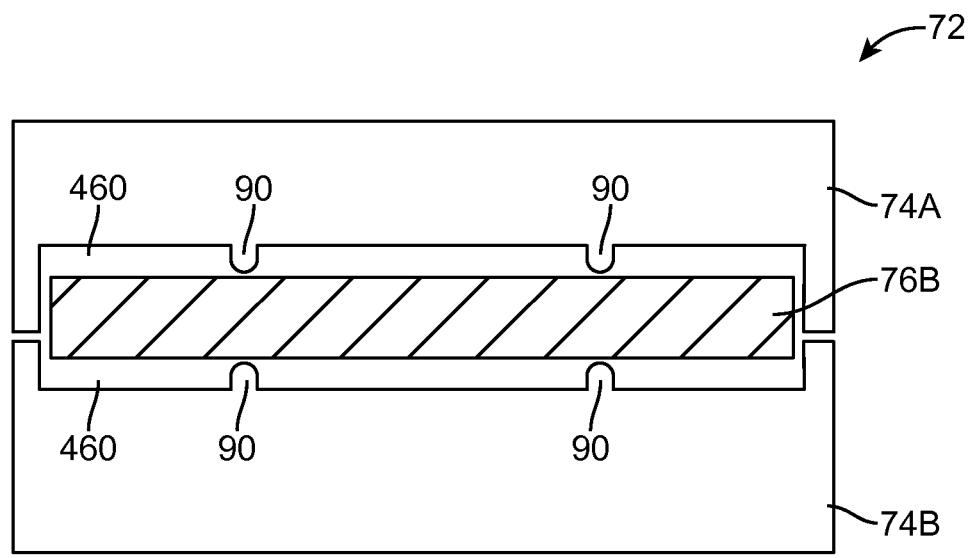
FIG. 8 is a cross-sectional side view of an illustrative injection molding tool having integral support pin structures for supporting a mold core in accordance with an embodiment of the present invention.

If desired, stabilizing structures such as pins 82 may be formed as integral portions of outer mold 74. As shown in FIG. 8, for example, mold 74 may have an upper portion such as portion 74A and a lower portion such as portion 74B. Portions 74A and 74B may have integral pins or other integral support structures such as such as protrusions 90 to stabilize mold core structures such as cores 76A and 76B. If desired, molding tool 72 may have some pins that are movable using computer-controlled actuators and some pins that are formed as integral protrusions of outer mold 74.

Following molding, equipment such as laser-based processing tools and other tools may be used in forming patterned conductive traces such as metal antenna traces on the exterior surface of plastic support structure 46. For example, patterned metal foil may be laminated onto the surface of support structure 46, etching, machining, and other patterning techniques may be used to pattern blanket metal films that have been formed on the surface of support structure 46, or other arrangements may be used to provide patterned metal traces on the surface of support structure 46.

Figure 9:
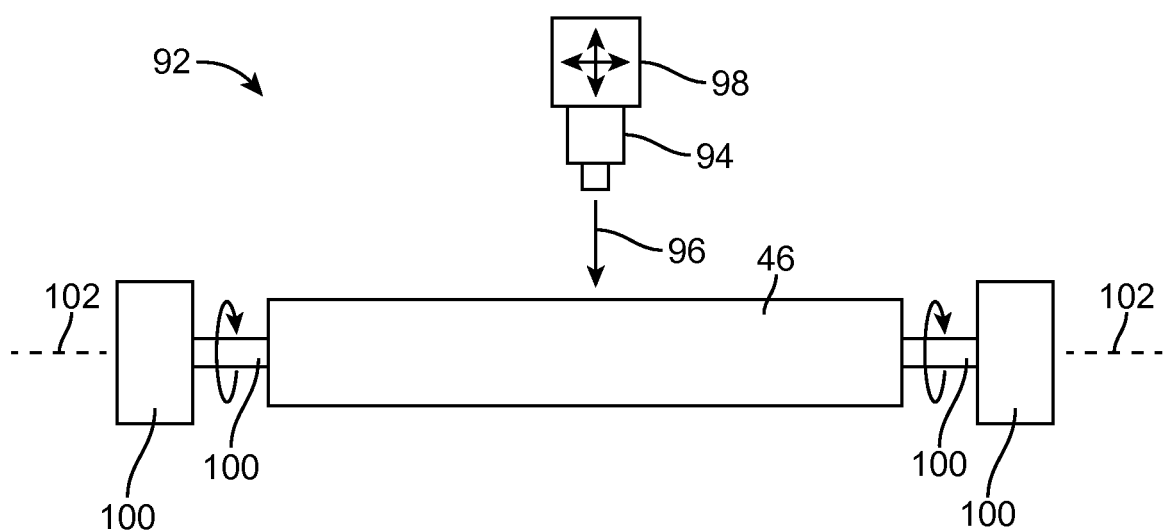
FIG. 9 is a diagram showing how a laser direct structuring tool may be used to pattern an antenna substrate in accordance with an embodiment of the present invention.

As shown in FIG. 9, laser-based tools such as laser direct structuring (LDS) equipment 92 may be used to process injection molded parts such as structures 46. Part 46 may be formed from a plastic (e.g., a plastic with an added metal complex or other suitable polymeric material) that can be selectively activated upon exposure to light. A light source such as laser 94 may generate a beam of light such as laser beam 96. Computer-controlled positioner 98 may control the position of beam 96 relative to support structure 46. To ensure that all sides of structure 46 can be exposed to laser beam 96, support structure 46 may be mounted in computer-controlled rotating positioners such as rotating positioners 100. Positioners 100 may rotate support structures 46 about axis 102, as positioner 98 moves beam 96 relative to the surface of support structure.

Following selective activation of the surface of support structure 46 by selectively exposing a desired pattern on the surface of structure 46 to laser light 96, metal traces may be grown on the surface of structure 46 Metal traces may, for example, be grown using metal deposition techniques such as electrochemical deposition (e.g., electroplating). Due to the selective surface activation of the surface of support structure 46, the metal that is grown on support structure 46 will only be formed in the areas that were activated by exposure to laser light 96. This allows a desired antenna pattern to be formed on the surface of support structure 46 (e.g., a pattern such as the illustrative pattern formed by traces 34 and 32 in FIG. 2 or other suitable patterns).

Figure 10:
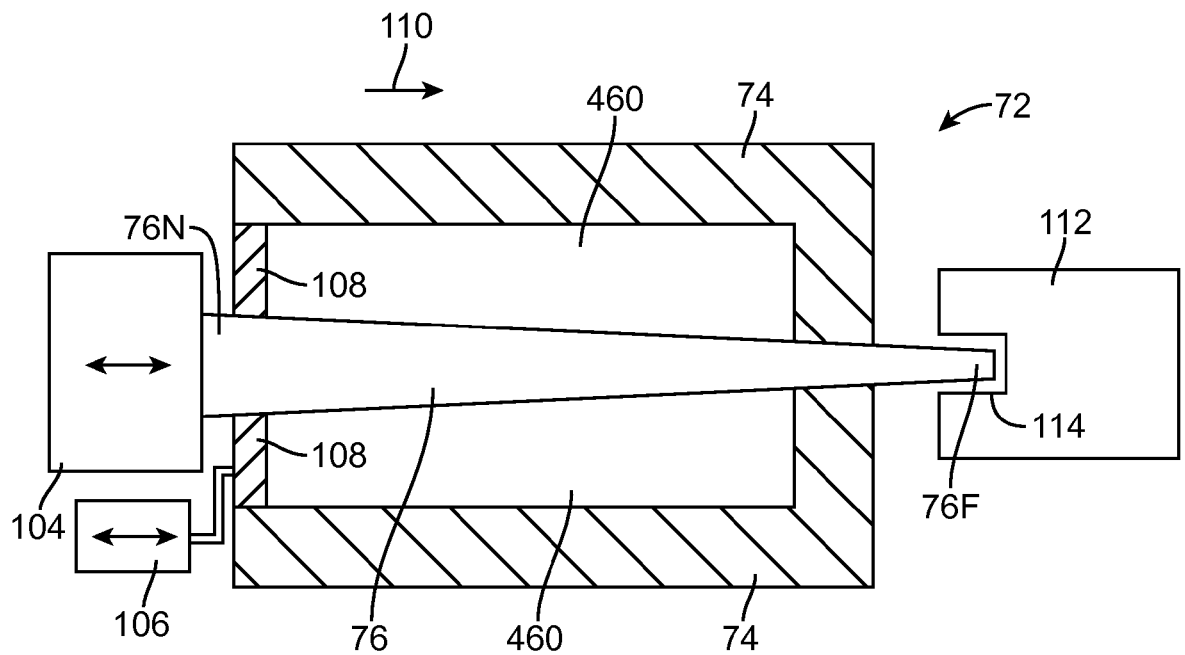
FIG. 10 is a diagram showing how a tapered mold core member and a support structure may be used in an injection molding machine in accordance with an embodiment of the present invention.

If desired, mold cores such as mold cores 76A and 76B may be supported at each end using a supporting configuration of the type shown in FIG. 10. As shown in FIG. 10, mold core 76 (e.g., mold core 76A and/or mold core 76B) may have opposing first and second ends such as ends 76N and 76F. End 76F may be supported by a support structure such as core support structure 112. Support structure 112 may have a feature such as recess 114 or other engagement feature that is configured to removably engage with mating end 76F of mold core structures 76F. End 76N of mold core 76 may be supported by support structure 104. Support structure 104 may, if desired, be a computer-controlled positioner for moving mold core in direction 110 when it is desired to insert end 76F of mold core 76 into recess 114 of support structure 112.

Mold portion 74 and mold core 76 may form an elongated cavity such as cavity 406 in the shape of structures 46. Following injection molding of plastic into cavity 406, ejection plate 108 may be moved in direction 110 by computer-controlled positioner 106, thereby removing support structure 46 from core structures 76. As shown in FIG. 10, mold core 76 may be tapered so that mold core 76 is wider in the vicinity of end 76N and is narrower in the vicinity of end 76F to facilitate removal of support structures 46 from mold core 76.

Figure 11:
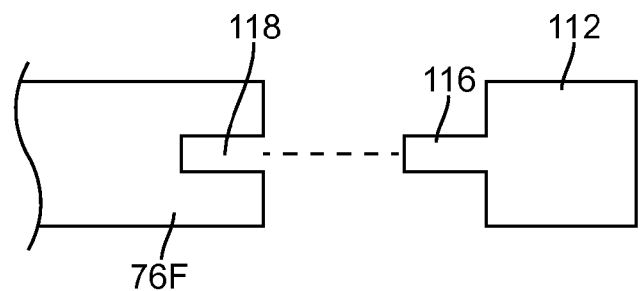
FIG. 11 is a diagram showing how a mold core in an injection molding machine may be supported by a support having a protrusion that mates with a corresponding recess in the mold core in accordance with an embodiment of the present invention.

As shown in FIG. 11, support structure 112 may, if desired, have a feature such as protrusion 116 for mating with recess 118 in end 76F of mold core 76.

Figure 12:
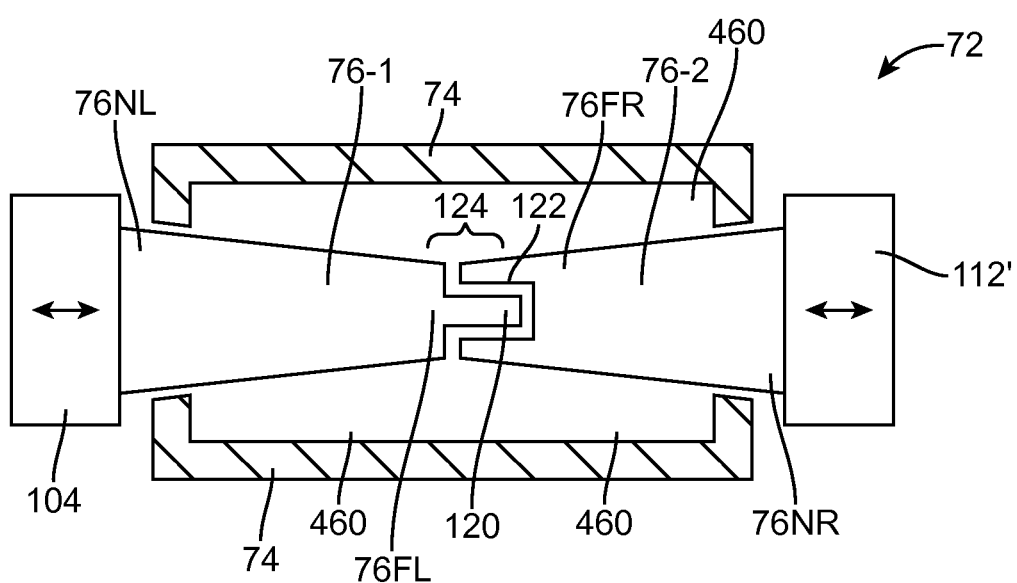
FIG. 12 is a diagram showing how a mold core in an injection molding machine may be supported using interlocking features on the ends of two mating mold core structures in accordance with an embodiment of the present invention.

FIG. 12 is a diagram showing how mold core 76 in injection molding machine 72 may be supported using interlocking features on the ends of two mating mold core members such as left-hand mold core 76-1 and right-hand mold core 76-1. End 76NL of mold core 76-1 may be supported by a support structure such as computer-controlled positioner 104. End 76NR of mold core 76-2 may be supported by a support structure such as computer-controlled positioner 112'. The width of mold core 76-1 may taper inwardly, so that end 76FL is narrower than end 76NL. The width of mold core 7602 may likewise taper inwardly, so that end 76FR is narrower than end 76NR. Tapers on the mold core parts may help facilitate removal of the mold core parts from structures 46 following injection molding into cavity 460 between the outer mold and the mold core.

Interlocking (engaging) features in region 124 may be used to couple mold core 76-1 to mold core 76-2 to provide support during injection molding operations. As shown in FIG. 12, for example, end 76FL may have a protrusion such as protrusion 120 that mates with a corresponding recess in opposing end 76FR of mold core 76-2 such as recess 122. Other types of engagement features may be used if desired. The illustrative configuration of FIG. 12 is merely illustrative.

Because the length of each mold core in molding tool 72 of FIG. 12 is reduced and because the engagement features in region 124 can be configured so that the mating ends of mold core structures 76-1 and 76-2 engage and support each other, the stability of the mold cores may be enhanced. In particular, for a given length of structure 46, the use of the configuration of FIG. 12 may help reduce the length of each individual mold core by a factor of two. For example, mold core 76-1 and mold core 76-2 may each be half as long as a single mold core such as mold core 76 of FIG. 10. As with the other illustrative injecting molding configurations, mold core 76-1 and mold core 76-2 of FIG. 12 may each include two parallel elongated mold core structures for forming the parallel cavities in support structure 46.

Multi-shot injection molding techniques may be used to produce plastic support structures with patterned metal traces for use in antennas such as antenna 28. Consider, as an example, the use of molding equipment and fabrication procedures illustrated in FIGS. 13, 14, 15, and 16.

Figure 13:
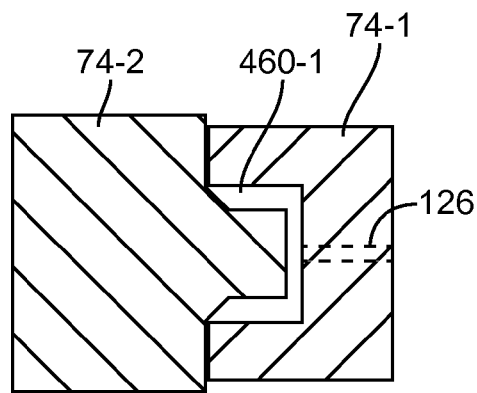
FIG. 13 is a cross-sectional view of an injection molding tool showing how the injection molding tool may form a cavity of a desired shape in accordance with an embodiment of the present invention.
Figure 14:
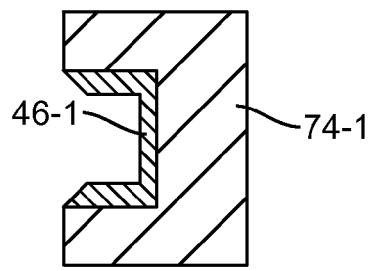
FIG. 14 is a cross-sectional side view of the injection molding tool of FIG. 13 following injection molding of a first shot of plastic and removal of a first mold core in accordance with an embodiment of the present invention.

FIG. 13 is a cross-sectional view of injection molding tool 72 in a configuration in which a cavity 460-1 has been formed between mold 74-1 and mold (core) 74-2. A first shot of plastic may be injection molded into cavity 460-1 via injection port 126. The first shot of plastic may be, for example, a plastic that has a high affinity to metal.

Following injection molding, mold core 74-2 may be removed. The injection molding of the first shot of plastic may form a first support structure portion such as portion 46-1 of FIG. 14.

Figure 15:
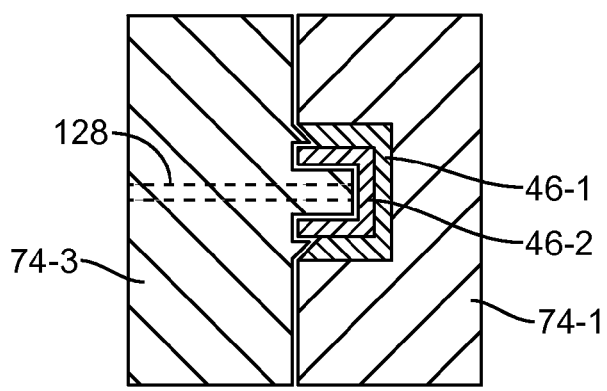
FIG. 15 is a cross-sectional side view of the injection molding tool of FIG. 14 having a second mold core that is being used to injection mold a second shot of plastic over the first shot of plastic in accordance with an embodiment of the present invention.

As shown in FIG. 15, after mold core 74-2 has been removed from the molding tool and replaced with mold core 74-3, a second shot of plastic may be injection molded on top of the first injection molded part. In particular, a second shot of plastic may be injection molded through injection molding port 128 into the cavity formed by mold core 74-3, thereby forming second support structure portion 46-2 on first support structure portion 46-1. The second shot of plastic may be formed from a material with a low affinity for metal (i.e., a metal affinity lower than that of the first shot of plastic).

Figure 16:
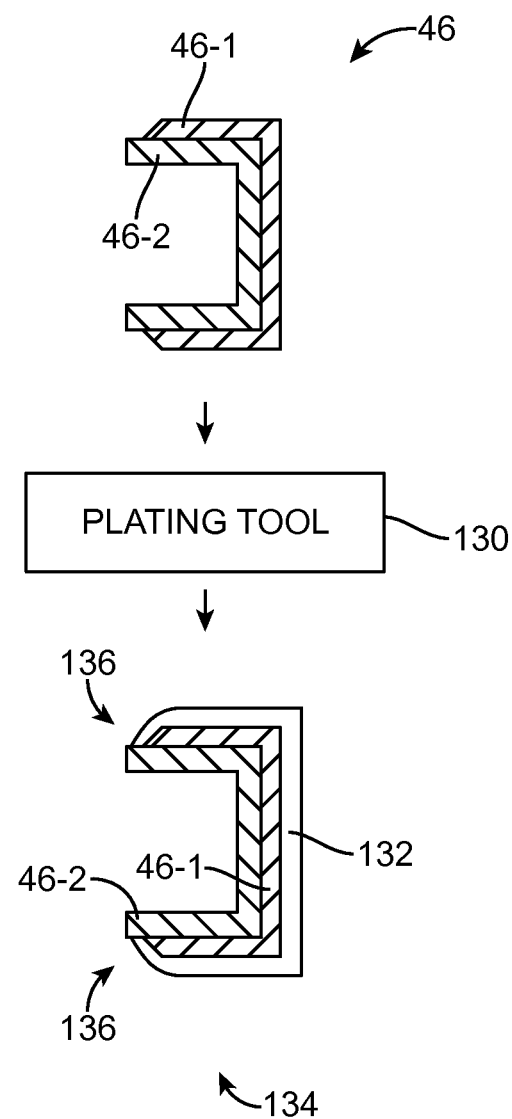
FIG. 16 is a diagram showing how an injection molded part of the type formed using equipment of the type shown in FIGS. 13, 14, and 15 may be coated with metal to form a patterned metal layer for an antenna in accordance with an embodiment of the present invention.

Following formation of the second shot of plastic, support structure portions 46-1 and 46-2 may form a plastic support structure such as plastic support structure 46 of FIG. 16. Portion 46-1 has a lower affinity for metal than portion 46-2, so following metal deposition with plating tool 130 or other metal coating equipment, an antenna structure such as antenna structure 134 of FIG. 16 may be formed in which a layer of metal such as metal 132 coats the exposed surfaces of portion 46-1 while leaving the exposed surfaces of portion 46-2 uncovered by metal. Portion 46-1 may have a solid surface (e.g., for forming a ground plane), may have a patterned surface (e.g., for forming an antenna trace pattern for an antenna resonating element or other antenna structures), or may have other suitable shapes. In the example of FIG. 16, antenna structures 134 include support structure surfaces for forming metal lip 136 in metal layer 132 and have an open box shape (e.g., for forming the lower portion of hollow support structures 46 of FIG. 2). Metal lip 136 may be used in soldering additional antenna structures to antenna structures 134 to form antenna structures 28.

Fabrication processes such as the fabrication process illustrated in FIGS. 13, 14, 15, and 16 are sometimes referred to as molded interconnect device fabrication processes. Structures such as structure 134 of FIG. 16 that have multiple shots of plastic with different metal affinities and a patterned metal coating that is patterned by patterning of the underlying shots of plastic prior to metal coating are sometimes referred to as molded interconnect devices.

Figure 17:
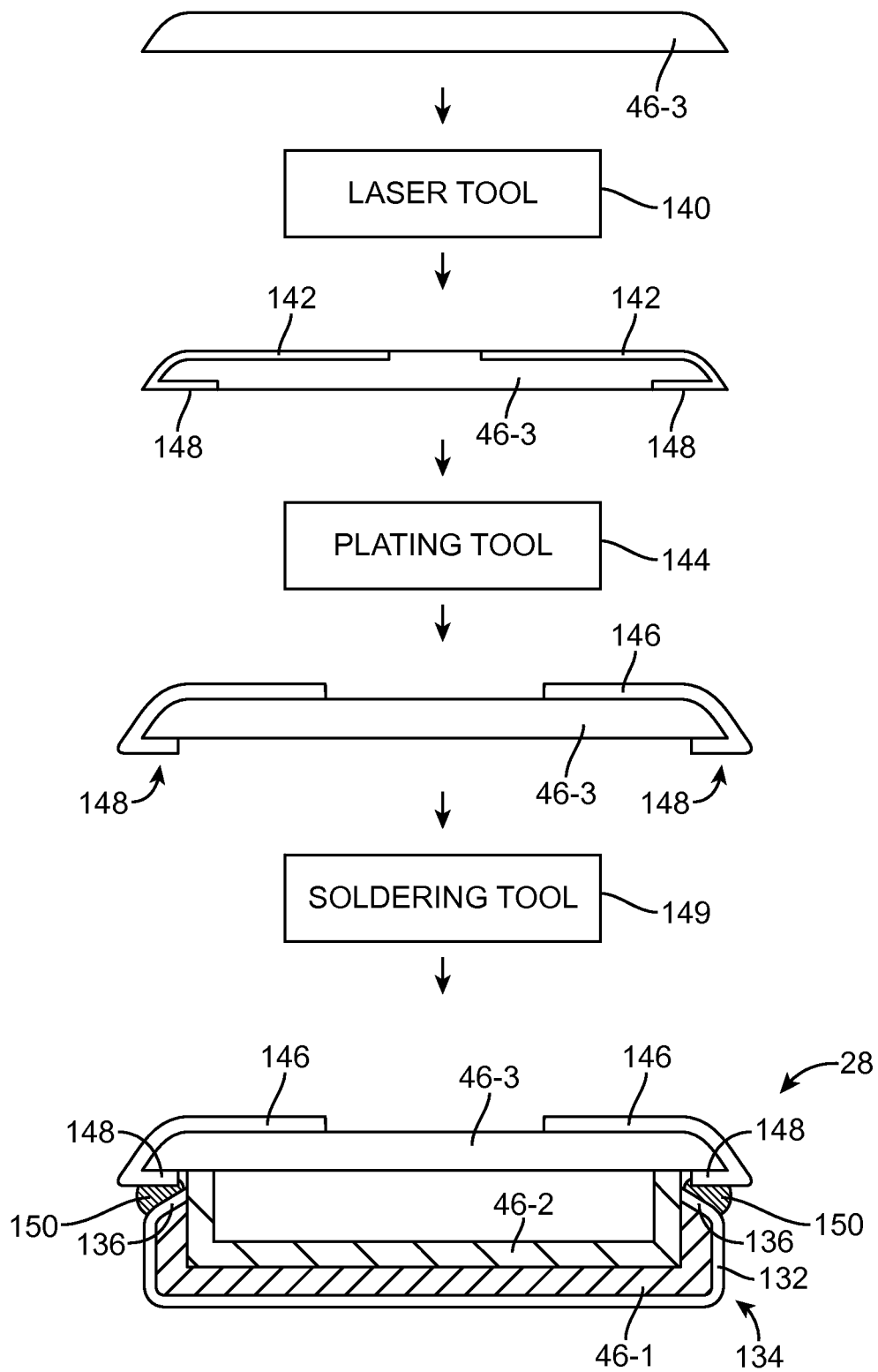
FIG. 17 is a diagram showing how laser direct structuring techniques may be used to form part of an antenna that is assembled with other patterned antenna parts to form an electronic device antenna in accordance with an embodiment of the present invention.

As shown in FIG. 17, antenna 28 may be formed by combining molded interconnect device structures such as structure 134 of FIG. 16 or other suitable structures with structures formed using other fabrication techniques such as structures formed using laser direct structuring (see, e.g., the laser patterned structures of FIG. 9), structures formed using printed circuits, other molded interconnect device structures, etc.

As shown in FIG. 17, a plastic part such as support structure portion 46-3 may be selectively exposed to light in a desired pattern. For example, laser tool 140 in laser direct structuring equipment or other equipment may be used to expose a desired pattern of the surface of support structure 46-3 to light, thereby activating the surface for subsequent metal deposition.

Following selective activation using laser tool 140, areas 142 on plastic structure 46-3 may be activated. Activated areas 142 may be selectively coated with metal 146 using a metal deposition tool such as electroplating tool 144, other electrochemical deposition equipment, or other metal deposition tool. The pattern in which metal 146 is deposited on structure 46-3 matches the pattern in which surface 142 was patterned by exposure to laser light from laser tool 140. Metal 146 may include portions such as lip portion 148 to facilitate subsequent attachment to other antenna structures.

Soldering tool 148 or equipment for depositing conductive adhesive, tools for attaching parts using fasteners, welds, or other attachment mechanisms may be used in attaching structure 46-3 and associated metal layer 146 to structures such as structures 134 of FIG. 16 to form antenna structures 28. During assembly operations, soldering tool 149 may be used to place solder paste between lip 136 of structures 134 and lip 148 of structures 46-3 to heat (reflow) the solder paste to form solder 150. As shown in FIG. 17, solder 150 may mechanically and electrically connect structures 46-3 and metal layer 146 on structures 46-3 to structures 46-1 and 46-2 and metal 132, thereby forming antenna structures 28.

Using assembly techniques of the type shown in FIG. 17, molded interconnect devices (e.g., parts having multiple shots of plastic such as structures 46-1 and 46-2 with different metal affinities and having associated metal coating structures) and other types of antenna structures (e.g., structure 46-3 and associated patterned metal layer 146) may be assembled to form antenna structures 28. It may be particularly efficient to form antenna structures from molded interconnect device structures when relatively large surface areas are to be covered (e.g., ground plane structures, larger portions of metal sheet 34 of FIG. 2, etc.). Laser direct structuring techniques may be particularly suitable for forming antenna structures with small metal trace features that benefit from the ability of laser direct structuring to form potentially complex patterns. Antenna structures 28 that are formed using both of these types of structures such as antenna structures 28 of FIG. 17 may benefit from the large area efficiency of a molded interconnect device and the flexible patterning capabilities of laser direct structuring methods.

If desired, extrusion techniques may be used to form plastic support structures 46. FIG. 18 is a diagram of an extrusion tool of the type that may be used to extrude structures 46. As shown in FIG. 18, extruded plastic structure 152 (e.g., an elongated strip of hollow extruded plastic) may be formed by extruding plastic material in direction 156 from opening 158 in extrusion tool 154.

Die cutting or other cutting techniques may be used to cut extruded plastic member 152 into antenna-sized lengths. If desired, die cutting tools may be used to form features such as illustrative notch 162 in extruded structure 160 of FIG. 19. Structure 160 may be, for example, a length of strip 152 that has been cut using a die press, laser, or other cutting tool such as cutting tool 163.

Extruded structures such antenna-sized extruded plastic structure 164 may also be formed using machining. For example, features such as tabs 166 and holes 168 may be formed in structure 164 using a milling machine (e.g., a CNC machine), a drill, a grinding tool, a sanding tool, or other machining tool such as machining tool 169.

Figure 21:
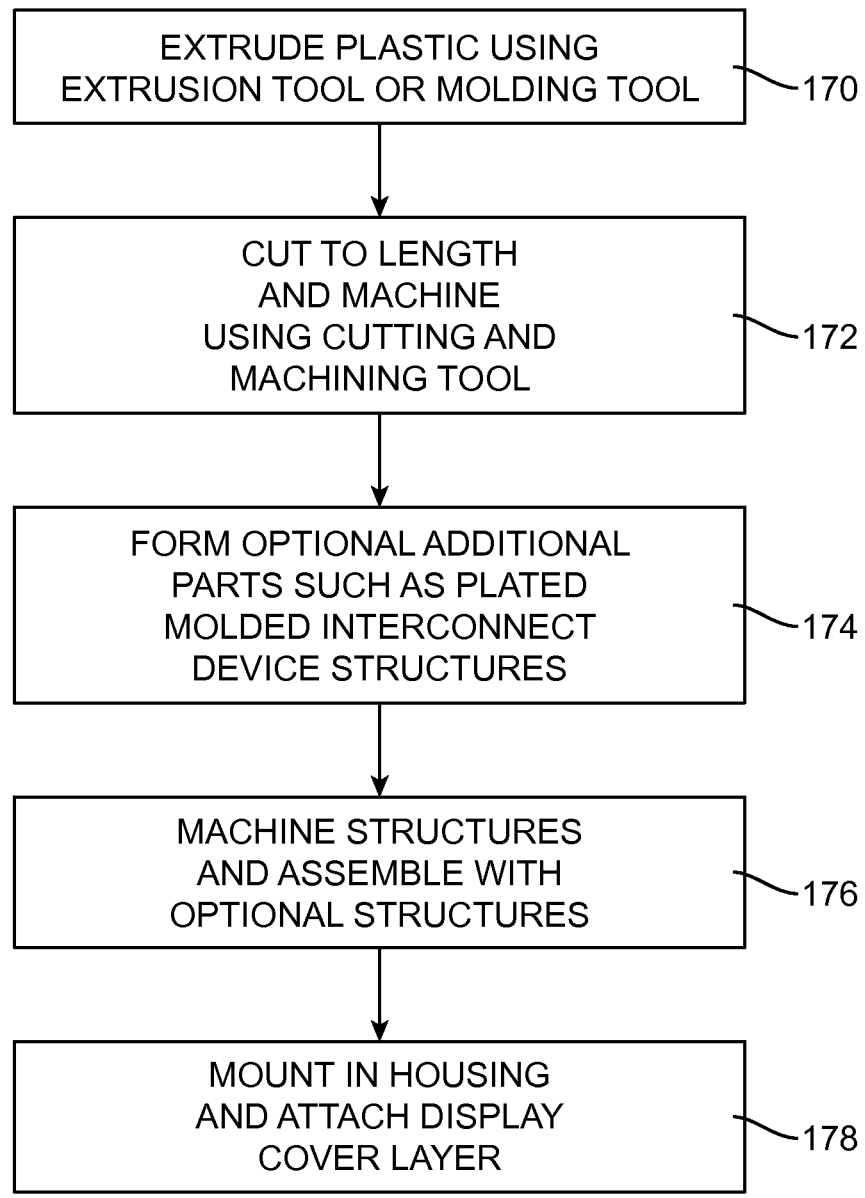
FIG. 21 is a flow chart of illustrative steps involved in forming electronic device antenna structures in accordance with an embodiment of the present invention.

Illustrative steps involved in forming antenna structures such as antenna structures 28 from plastic support structures such as plastic support structures 46 are shown in FIG. 21.

At step 170, plastic structures may be formed using tools such as extrusion tool 154, injection molding tool 72, or other fabrication equipment. As an example, a strip of hollow plastic structures such as structures 152 of FIG. 18 may be extruded using extrusion tool 154 of FIG. 18 or plastic structures 46 may be formed using injection molding equipment 72. During injection molding operations, an injection molding core structure may be stabilized using pins, protrusions, support structures, or other stabilizing features.

During the operations of step 172, optional cutting and machining operations may be performed. For example, when forming plastic structures from a strip of extruded material, it may be desirable to cut the strip of extruded material into shorter lengths (i.e., antenna-sized lengths). Die cutting, machining, laser cutting, plasma cutting, water jet cutting, hot-wire cutting, compression molding, stamping, and other fabrication techniques may be used in cutting and pattering the plastic structures with tools such as tools 163 and 169.

At step 174, optional additional antenna structures may be formed. For example, additional plastic structures such as molded interconnect device structures may be formed by coating multiple shots of plastic with different metal affinities with a layer of metal, using laser direct structuring techniques and other patterning techniques to form dielectric substrates with patterned metal antenna traces, and otherwise forming one or more plastic structures for use with the structures formed using the operations of steps 170 and 172.

The optional structures formed during the operations of step 174 may be attached to the structures formed during steps 170 and 172 using soldering (see, e.g., soldering tool 148 and solder 150 of FIG. 17), thereby forming antenna structures 28.

At step 178, the antenna structures may be mounted in device housing 12. For example, screws may be passed through screw holes and used to screw antenna structures 28 into place in housing 12 in device 10. After mounting antenna structures 28 to housing 12, adhesive may be placed on surfaces such as antenna surface 58. Display cover layer 50 may then be mounted in device housing 12. During the mounting of display cover layer 50, the presence of the adhesive between display cover layer 50 and surface 58 of antenna 28 may help hold display cover layer 50 in place in device 10.

If desired, antenna structures 28 may be formed using injection molding without using laser direct structuring. As an example, antenna structures 28 may be formed using multiple shots of plastic with different metal affinities that are coated with metal without attaching laser direct structuring parts or other parts (e.g., using techniques of the type shown in FIGS. 13, 14, 15, and 16).

Antenna structures 28 may also be formed using laser direct structuring techniques (e.g., laser patterning to activate the surface of an injection molded structure or extruded structure) without using molded interconnect device fabrication techniques (e.g., by patterning structures 46 using the equipment of FIG. 9 and metal coating equipment).

The foregoing is merely illustrative of the principles of this invention and various modifications can be made by those skilled in the art without departing from the scope and spirit of the invention.

What is claimed is:

1. An electronic device, comprising:
 a housing;
 an antenna that is attached to the housing, wherein the antenna has an antenna surface;
 a dielectric member; and
 adhesive that attaches the dielectric member to the antenna surface, wherein the antenna comprises a hollow plastic support structure having patterned metal antenna traces on the antenna surface.

2. The electronic device defined in claim 1 wherein the housing has at least one housing surface that is flush with the antenna surface and wherein the adhesive attaches the dielectric member to the housing surface and the antenna surface.

3. The electronic device defined in claim 2 wherein the dielectric member comprises a transparent dielectric member.

4. The electronic device defined in claim 2 wherein the dielectric member comprises a display cover layer, wherein the electronic device further comprises display structures that include an array of display pixels, and wherein the display cover layer covers the display structures.

5. The electronic device defined in claim 4 wherein the antenna comprises:
 a dielectric support structure; and
 patterned metal antenna traces on the antenna surface.

6. The electronic device defined in claim 5 wherein the hollow plastic support structure has a portion that forms the antenna surface and wherein the electronic device comprises screws that mount the hollow plastic support structure to the housing.

7. The electronic device defined in claim 1 wherein the housing comprises a metal housing and wherein the dielectric member comprises a display cover layer.

8. The electronic device defined in claim 1 wherein the hollow plastic support structure comprises an extruded hollow plastic support structure.

9. An electronic device, comprising:
 a housing;
 an antenna that is attached to the housing, wherein the antenna has an antenna surface;
 a dielectric member;
 adhesive that attaches the dielectric member to the antenna surface, wherein the housing comprises a metal housing; and
 conductive foam that electrically shorts the patterned metal antenna traces to the metal housing.

10. The electronic device defined in claim 9 wherein the antenna comprises a loop antenna resonating element.

11. An antenna, comprising:
 a first portion comprising a first plastic support with antenna traces, wherein the first plastic support comprises first and second shots of plastic with different metal affinities; and
 a second portion comprising a second plastic support with antenna traces.

12. The antenna defined in claim 11 wherein the second portion comprises a laser direct structuring plastic support with patterned metal traces.

13. The antenna defined in claim 12 further comprising solder with which the patterned metal traces on the laser direct structuring plastic support are soldered to the antenna traces on the first portion.

14. The antenna defined in claim 13 wherein the antenna traces on the first and second portions are configured to form a loop antenna resonating element.

15. The antenna defined in claim 13, wherein a bent lip structure on the patterned metal traces on the laser direct structuring plastic support are soldered to a bent lip structure on the antenna traces on the first portion.

16. The antenna defined in claim 11, wherein the first plastic support comprises a first extruded hollow plastic support structure.

17. The antenna defined in claim 16, wherein the second plastic support comprises a second extruded hollow support structure.

18. The antenna defined in claim 11, wherein the second shot of plastic in the first plastic support contacts the second plastic support.

19. A method of forming an antenna, comprising:
 injection molding a first antenna support structure from first and second shots of plastic having different metal affinities;
 coating the first antenna support structure with metal that covers the first shot of plastic while leaving the second shot of plastic uncovered by metal;
 using laser processing to form a second antenna support structure with patterned antenna traces; and
 attaching the first antenna support structure to the second antenna support structure to form the antenna.

20. The method defined in claim 19 wherein attaching the first antenna support structure to the second antenna support structure comprises soldering the first antenna support structure to the second antenna support structure.

21. The method defined in claim 20 wherein using laser processing comprises forming the second antenna support structure by performing laser direct structuring operations with laser direct structuring equipment.

22. An electronic device, comprising:
 a housing;
 an antenna that is attached to the housing, wherein the antenna has an antenna surface;
 a dielectric member; and
 adhesive that attaches the dielectric member to the antenna surface, wherein the housing has at least one housing surface that is flush with the antenna surface and the adhesive attaches the dielectric member to the housing surface and the antenna surface, the antenna surface comprises a curved antenna surface, and the at least one housing surface comprises a curved housing surface that lies flush with the curved antenna surface.

23. The electronic device defined in claim 22, wherein the dielectric member comprises a planar dielectric member.

24. The electronic device defined in claim 23, wherein the dielectric member comprises a transparent display cover layer for a display in the electronic device.

25. The electronic device defined in claim 24, wherein the antenna comprises:
   a dielectric support structure having a first planar surface that is substantially parallel to the display cover layer and a second planar surface that extends perpendicular to the first planar surface; and
   patterned metal antenna traces on the antenna surface, wherein the display comprises a display module interposed between the display cover layer and the first planar surface of the dielectric support structure.

* * * * *